United States Patent Office 2,738,860
Patented Mar. 20, 1956

2,738,860

RECOVERY OF ACETYLENE SOLVENTS

Lothar Lorenz, Ludwigshafen (Rhine), and Wilhelm Chorbacher, Neustadt (Haardt), Germany, assignors to Badische Anilin- & Soda-Fabrik Aktiengesellschaft, Ludwigshafen (Rhine), Germany No Drawing. Application January 16, 1952,
Serial No. 266,776

Claims priority, application Germany February 17, 1951

13 Claims. (Cl. 183—115)

This invention relates to a method of recovering acetylene solvents and in particular to the recovery or purification of such solvents as have been used in the separation of acetylene from gaseous mixtures containing same. Such mixtures may be obtained in the high-temperature, e. g. thermal or electrical decomposition or partial combustion of natural gas and similar low molecular paraffin hydrocarbons.

It is well known that diluted acetylene of the type referred to above may be concentrated and purified by treating it with a solvent of selective absorption power for acetylene. Usually, organic solvents are used for that purpose. The general practice is to compress the dilute acetylene, washing it with the selective solvent under superatmospheric pressure to absorb acetylene, withdrawing the solvent from the absorption zone, allowing the acetylene to get released from the solvent by increasing the temperature and/or decreasing the pressure, and recirculating the solvent to the absorption zone.

Gas mixtures obtained by the thermal or electrical decomposition or the partial oxidation of natural gas contain in addition to acetylene very frequently impurities which are also soluble in the organic solvents used for selectively extracting the acetylene. Sometimes, these impurities have an even better solubility than acetylene and, therefore, tend to accumulate in the circulating solvent, thereby increasing the viscosity of the solvent and even causing the formation of precipitates or deposits.

It is an object of our invention to avoid the accumulation of such impurities in the solvent by a method which allows an almost complete recovery of the solvent simultaneously with the removal of the impurities. Other objects and advantages of our invention will be more fully understood by the following description.

Our invention consists in withdrawing at least part of the solvent used in the purification of acetylene contained in dilute acetylene, diluting it with water and removing therefrom the precipitate formed. The clear liquid obtained after the removal of the precipitate consists almost exclusively of the solvent and water. It is very simple to recover therefrom the anhydrous solvent by distillation, if so required. A preferred method of carrying out our invention comprises subjecting the solvent to be purified to a distillation, driving off a substantial part of the solvent and diluting the distillation residue with water and separating off the precipitate.

It is an advantage of our invention that by the proposed method the impurities accumulating in the solvent are precipitated in a form which allows a very simple removal thereof. For example, the precipitate may be filtered off by conventional means; it may be separated by a centrifugation or by allowing the precipitate to deposit and drawing off the clear liquid.

Since the purification of acetylene with the aid of organic solvents is carried out in a continuous process wherein the solvent is circulated, it would be inconvenient to subject the solvent in its entirety to the method according to our invention. Consequently, we prefer to branch off from time to time or continuously part of this solvent. The optimal percentage of this branched off part in relation to the total depends on the composition of the dilute acetylene and other factors in the purification system.

The branched off part of the solvent is either diluted with water, preferably with from the same amount to 6 times or even more of its own volume. In order to save the handling of big volumes of liquid, it is an improved method of working to distill off part of the solvent prior to dilution with water.

We prefer to carry out the distillation of the said solvent to an extent that at least 50, better from 70 to 80 per cent but preferably not more than from 90 to 95 percent of the solvent are obtained in the form of a distillate. If the solvent contains lower boiling constituents, e. g. water and/or hydrocarbons, these may be obtained as a first fraction before distilling off the bulk of the solvent. The distillation residue is then admixed with preferably from half to three times of its own volume of water.

The optimal amount of water to be added depends on the composition of the dilute acetylene which has been concentrated with the aid of the solvent and on the length of time during which the solvent has been circulated. After the removal of the precipitate the mixture of solvent and water may be, as already mentioned, subjected to a further distillation whenever an anhydrous solvent is desired. If the solvent to be used for the extraction of acetylene should contain water anyway in one or more stages of the recovery process, the solvent diluted with water and separated from the precipitate may be used as such.

The particular solvent used for carrying out our invention is not essential, provided that it is miscible at least partly with water. We prefer oxygen containing organic solvents, miscible with water and having a boiling point above that of water. Solvents of that type are, for example, aliphatic carbonyl compounds and their acetals, aliphatic ethers, in particular those containing in addition to the ether group a further hydrophilic group, e. g. a hydroxy group or another ether group, such as ethylene glycol mono alkyl ethers, carboxylic esters, in particular those containing hydrophilic groups in addition to the ester group either in the acid or in the alkyl radicle. We have found that aliphatic lactones, such as $\gamma$-butyrolactone and its homologues, and aliphatic carboxylic acid amides, in particular those derived from alkylated amines, are most suitable. Amides of that kind are, for example, dialkyl formamides, especially those containing alkyl radicles up to 4 carbon atoms, alkylated ureas, bis-$C_1$- to $C_4$-dialkyl amides of dicarboxylic amides, and lactames, such as pyrrolidone and its substitution products containing lower aliphatic hydrocarbon radicals in the nitrogen atom, and the homologues of such lactames.

Our invention is illustrated by the following example but not limited thereto. The parts are by weight unless otherwise stated.

Example

A gas obtained by the partial oxidation of methane with oxygen and containing 8.3 per cent by volume of acetylene, 3.4 per cent of carbon dioxide, 0.5 per cent of higher acetylene hydrocarbons, 0.2 per cent of ethylene, 0.4 per cent of oxygen, 24.6 per cent of carbon monoxide, 56.2 per cent of hydrogen and 6.4 per cent of methane is purified with butyrolactone by washing the gas under superatmospheric pressure, e. g. 6 to 8 atmospheres, and releasing the acetylene by gentle heating and application of subatmospheric pressure. After using the butyrolactone continuously, it acquires a viscosity of 2 centistokes at 20° C. 1000 parts of this butyrolactone are distilled with the aid of a column under a pressure of 0.1 atmosphere. As a first fraction 40 parts of water and 0.7 part of higher boiling acetylene hydrocarbons are obtained. The main fraction consists of 874 parts of butyrolactone which corresponds in all its properties to pure butyrolactone and which is used directly again for the isolation of acetylene. The residue (100 parts) is admixed with 100 parts of water. A precipitate is formed which is allowed to settle during some time and then filtered off. The filter cake is washed with 10 parts of water which is then added to the main filtrate. The whole is then either distilled to drive off the water, thereby obtaining substantially pure butyrolactone as a distillation residue, or it is used directly for the recovery of acetylene when this process is carried out with the aid of aqueous butyrolactone.

We claim:

1. In the process of separating acetylene from acetylene containing gas mixtures produced by high-temperature decomposition of low molecular weight paraffin hydrocarbons, by absorbing acetylene in an aliphatic carbonyl compound solvent, being at least partly miscible with water and having selective absorption power for acetylene, releasing the acetylene from its solution in such solvent, and recirculating said solvent, the steps which comprise withdrawing from said circulation at least part of the solvent, diluting it with water, removing therefrom the precipitate formed and returning the solvent to the separating process.

2. In the process of separating acetylene from acetylene containing gas mixtures produced by high-temperature decomposition of low molecular weight paraffin hydrocarbons, by absorbing acetylene in an aliphatic carbonyl compound solvent, being at least partly miscible with water and having selective absorption power for acetylene, releasing the acetylene from its solution in such solvent, and recirculating said solvent, the steps which comprise withdrawing from said circulation at least part of the solvent, subjecting it to a distillation driving off a substantial part of the solvent, diluting the distillation residue with water, removing therefrom the precipitate formed and returning the solvent to the separating process.

3. In the process of separating acetylene from acetylene containing gas mixtures produced by high-temperature decomposition of low molecular weight paraffin hydrocarbons, by absorbing acetylene in an aliphatic carbonyl compound solvent, being at least partly miscible with water and having selective absorption power for acetylene, releasing the acetylene from its solution in such solvent, and recirculating said solvent, the steps which comprise withdrawing from said circulation at least part of the solvent, subjecting it to a distillation driving off from 50 to 95 per cent of the solvent, diluting the distillation residue with water, removing therefrom the precipitate formed and returning the solvent to the separating process.

4. In the process of separating acetylene from acetylene containing gas mixtures produced by high-temperature decomposition of low molecular weight paraffin hydrocarbons, by absorbing acetylene in an aliphatic carbonyl compound solvent selected from the group consisting of aliphatic lactones and aliphatic carboxylic acid amides, being at least partly miscible with water and having selective absorption power for acetylene, releasing the acetylene from its solution in such solvent, and recirculating said solvent, the steps which comprise withdrawing from said circulation at least part of the solvent, diluting it with water, removing therefrom the precipitate formed, and returning the solvent to the separating process.

5. In the process of separating acetylene from acetylene containing gases obtained by the partial oxidation of low molecular paraffin hydrocarbons by absorbing acetylene in butyrolactone, releasing the acetylene from its solution in butyrolactone, and recirculating butyrolactone, the steps which comprise withdrawing from said circulation at least part of the butyrolactone, subjecting it to a distillation driving off a substantial part of the butyrolactone, diluting the distillation residue with water, removing therefrom the precipitate formed and returning the solvent to the separating process.

6. In the process of separating acetylene from acetylene containing gases obtained by the partial oxidation of low molecular paraffin hydrocarbons by absorbing acetylene in butyrolactone, releasing the acetylene from its solution in butyrolactone, and recirculating butyrolactone, the steps which comprise withdrawing from said circulation at least part of the butyrolactone, subjecting it to a distillation driving off from 50 to 95 per cent of the butyrolactone, diluting the distillation residue with water, removing therefrom the precipitate formed and returning the butyrolactone to the process.

7. In the process of separating acetylene from acetylene containing gases obtained by the partial oxidation of low molecular paraffin hydrocarbons by absorbing acetylene in butyrolactone, releasing the acetylene from its solution in butyrolactone, and recirculating butyrolactone, the steps which comprise withdrawing from said circulation at least part of the butyrolactone, subjecting it to a distillation driving off from 50 to 95 per cent of the butyrolactone, diluting the distillation residue with water, removing therefrom the precipitate formed, subjecting the remaining liquid to a distillation to obtain concentrated butyrolactone and returning the butyrolactone to the process.

8. In the process of separating acetylene from acetylene containing gases obtained by the partial oxidation of low molecular paraffin hydrocarbons by absorbing acetylene in butyrolactone, releasing the acetylene from its solution in butyrolactone, and recirculating butyrolactone, the steps which comprise withdrawing from said circulation at least part of the butyrolactone, subjecting it to a distillation driving off from 50 to 95 per cent of the butyrolactone, diluting the distillation residue with from half to three times in its own volume of water, removing therefrom the precipitate formed, and returning the butyrolactone to the process.

9. In the process of separating acetylene from acetylene containing gases obtained by the partial oxidation of low molecular paraffin hydrocarbons by absorbing acetylene in butyrolactone, releasing the acetylene from its solution in butyrolactone, and recirculating butyrolactone, the steps which comprise withdrawing from said circulation at least part of the butyrolactone, subjecting it to a distillation driving off from 50 to 95 per cent of the butyrolactone, diluting the distillation residue with from half to three times its own volume of water, removing therefrom the precipitate formed, subjecting the remaining liquid to a distillation to obtain concentrated butyrolactone and returning the butyrolactone to the process.

10. In the process of separating acetylene from acetylene containing gas mixtures produced by high-temperature decomposition of low molecular weight paraffin hydrocarbons by absorbing acetylene in an aliphatic lactone solvent, being at least partly miscible with water and having selective absorption power for acetylene, releasing the acetylene from its solution in such solvent, and recirculating said solvent, the steps which comprise withdrawing from said circulation at least part of the solvent, diluting it with sufficient water to form a precipitate, removing therefrom the precipitate formed, and returning the solvent to the separating process.

11. In the process of separating acetylene from acetylene containing gas mixtures produced by high-temperature decomposition of low molecular weight paraffin hydrocarbons, by absorbing acetylene in an aliphatic carboxylic acid amide solvent, being at least partly miscible with water and having selective absorption power for acetylene, releasing the acetylene from its solution in such solvent, and recirculating said solvent, the steps which comprise withdrawing from said circulation at least part of the solvent, diluting it with sufficient water to form a precipitate, removing therefrom the precipitate formed, and returning the solvent to the separating process.

12. In the process of separating acetylene from acetylene containing gas mixtures produced by high-temperature decomposition of low molecular weight paraffin hydrocarbons, by absorbing acetylene in butyrolactone, releasing the acetylene from its solution in butyrolactone, and recirculating butyrolactone, the steps which comprise withdrawing from said circulation at least part of the butyrolactone, diluting it with sufficient water to form a precipitate, removing therefrom the precipitate formed, and returning the butyrolactone to the separating process.

13. In the process of separating acetylene from acetylene containing gases obtained by the partial oxidation of low molecular paraffin hydrocarbons and containing about 8.3% by volume of acetylene, by absorbing acetylene in butyrolactone, releasing the acetylene from its solution in butyrolactone, and recirculating butyrolactone, the steps which comprise withdrawing from said circulation at least part of the butyrolactone, subjecting it to a distillation driving off from 50 to 85 per cent of the butyrolactone, diluting the distillation residue with from half to three times its own volume of water, removing therefrom the precipitate formed, and returning the butyrolactone to the process.

References Cited in the file of this patent

UNITED STATES PATENTS

| | | |
|---|---|---|
| 2,063,680 | Isham | Dec. 8, 1936 |
| 2,236,964 | Babcock | Apr. 1, 1941 |
| 2,371,908 | Morris | Mar. 20, 1945 |
| 2,426,705 | Patterson et al. | Sept. 2, 1947 |
| 2,461,346 | Patterson | Feb. 8, 1949 |
| 2,667,234 | Hasche | Jan. 26, 1954 |

OTHER REFERENCES

"Organic Chemistry," by Hill & Kelley, the Blakiston Co., 1943, page 84.